(12) United States Patent
Kreitler

(10) Patent No.: US 6,902,239 B2
(45) Date of Patent: Jun. 7, 2005

(54) STRUCTURAL HEAD RESTRAINT GUIDE

(75) Inventor: Thomas E. Kreitler, Farmington Hills, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/485,478

(22) PCT Filed: Aug. 1, 2002

(86) PCT No.: PCT/US02/24398

§ 371 (c)(1), (2), (4) Date: Jun. 1, 2004

(87) PCT Pub. No.: WO03/013905

PCT Pub. Date: Feb. 20, 2003

(65) Prior Publication Data

US 2004/0201266 A1 Oct. 14, 2004

Related U.S. Application Data

(60) Provisional application No. 60/309,545, filed on Aug. 1, 2001.

(51) Int. Cl.[7] .................................................. A47C 1/10
(52) U.S. Cl. ....................................................... 297/410
(58) Field of Search ................................ 297/391, 410, 297/452.18, 452.2

(56) References Cited

U.S. PATENT DOCUMENTS

| | | | |
|---|---|---|---|
| 3,209,575 A | | 10/1965 | Woodward et al. |
| 4,527,834 A | * | 7/1985 | Zyngier ...................... 297/410 |
| 4,582,259 A | | 4/1986 | Hoover et al. |
| 4,589,698 A | * | 5/1986 | Suzuki ........................ 297/410 |
| 4,854,642 A | | 8/1989 | Vidwans et al. |
| 4,976,493 A | | 12/1990 | Frankila |
| 5,445,434 A | * | 8/1995 | Kohut ......................... 297/391 |
| 5,667,276 A | | 9/1997 | Connelly et al. |
| 5,788,250 A | | 8/1998 | Masters et al. |
| 5,816,658 A | | 10/1998 | Wallis |
| 5,890,387 A | | 4/1999 | Roper et al. |
| 6,035,516 A | | 3/2000 | Peterson |
| 6,062,645 A | | 5/2000 | Russell |
| 6,099,077 A | | 8/2000 | Isaacson |
| 6,296,316 B1 | * | 10/2001 | Hann ....................... 297/463.1 |
| 6,761,409 B2 | * | 7/2004 | Ford .......................... 297/410 |

FOREIGN PATENT DOCUMENTS

| | | |
|---|---|---|
| DE | 197 28 618 C | 1/1999 |
| EP | 0 798 158 A | 10/1997 |
| FR | 2 122 722 A | 9/1972 |

* cited by examiner

Primary Examiner—Peter M. Cuomo
Assistant Examiner—Joseph Edell
(74) Attorney, Agent, or Firm—Clark Hill PLC

(57) ABSTRACT

A head restraint guide assembly mounted into apertures formed in a seatback frame for receiving support posts of a head restraint. The head restraint guide allows for incremental adjustment and locking of the height of the head restraint relative to the seatback frame. The guide assembly has opposite upper and lower ends. A center bore extends between and through both of the upper and lower ends. The guide assembly comprises a generally cylindrical main body having upper and lower portions. A lip is formed in the upper portion adjacent to the lower portion. A lattice of structural ribs extends outwardly from the upper portion and extends between the lip and the upper end of the guide assembly. The lower portion comprises a pair of symmetrically opposite and spaced apart legs that extend downwardly from the upper portion. The legs are elastically inwardly displaceable. Each leg includes a ramped surface to facilitate insertion into the seatback frame. Each ramped surface terminates at a locating edge. The lip and the locating edge together serve to axially locate and lock the guide assembly in the apertures of the seat back.

5 Claims, 4 Drawing Sheets

US 6,902,239 B2

STRUCTURAL HEAD RESTRAINT GUIDE

RELATED APPLICATION

This application claims priority to and all the benefits of U.S. Provisional Application No. 60/309,545, filed on Aug. 1, 2001.

FIELD OF THE INVENTION

This invention relates to a head restraint for an automotive vehicle seat and, more particularly, to a head restraint guide sleeve for providing incremental height adjustment of the head restraint relative to a seat back.

DESCRIPTION OF THE PRIOR ART

Automotive vehicles include seat assemblies for supporting occupants within the vehicle. A seat assembly comprises a seat cushion and a seat back. The seat back is typically operatively interconnected to the seat cushion by a recliner mechanism that allows angular adjustment of the seat back relative to the seat cushion. The seat back includes an inverted U-shaped frame constructed usually of steel tube. The frame has a horizontal upper cross member that defines and supports an upper portion of the seat back.

Typically, a head restraint is adjustably mounted to the upper cross member of the seat back for supporting the head of the occupant. An adjustment mechanism allows for incremental vertical adjustment of the head restraint relative to the seat back. The adjustment mechanism includes at least one, but usually a pair of guide tubes fixedly secured to the upper cross member. A guide sleeve is inserted into each guide tube. Each guide sleeve has a spring-biased locking tab. The adjustment mechanism also includes rigid rods that extend vertically downwardly from the head restraint and through a corresponding guide sleeve. The rods slide within their respective guide sleeve as the height of the head restraint relative to the upper cross member is adjusted. Detents, or locating recesses, are formed along the rod and spaced apart at regular intervals for engaging the locking tabs of the guide sleeve. While engaged with the detents in the rods, the locking tabs hold the position of the head restraint relative to the upper cross member.

SUMMARY OF THE INVENTION

According to one aspect of the invention, a head restraint guide is provided for defining a channel between a top of a seat back and through an aperture of a seat back frame to allow a support post of a head restraint to slide therethrough. The head restraint guide includes a center tube extending between first and second ends. The center tube defines an outer surface and a bore extending axially therethrough. A support extends between the first end and an intermediate point along the center tube between the first and second ends corresponding to a portion of the center tube extending out from the seat back frame to the top of the seat back.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
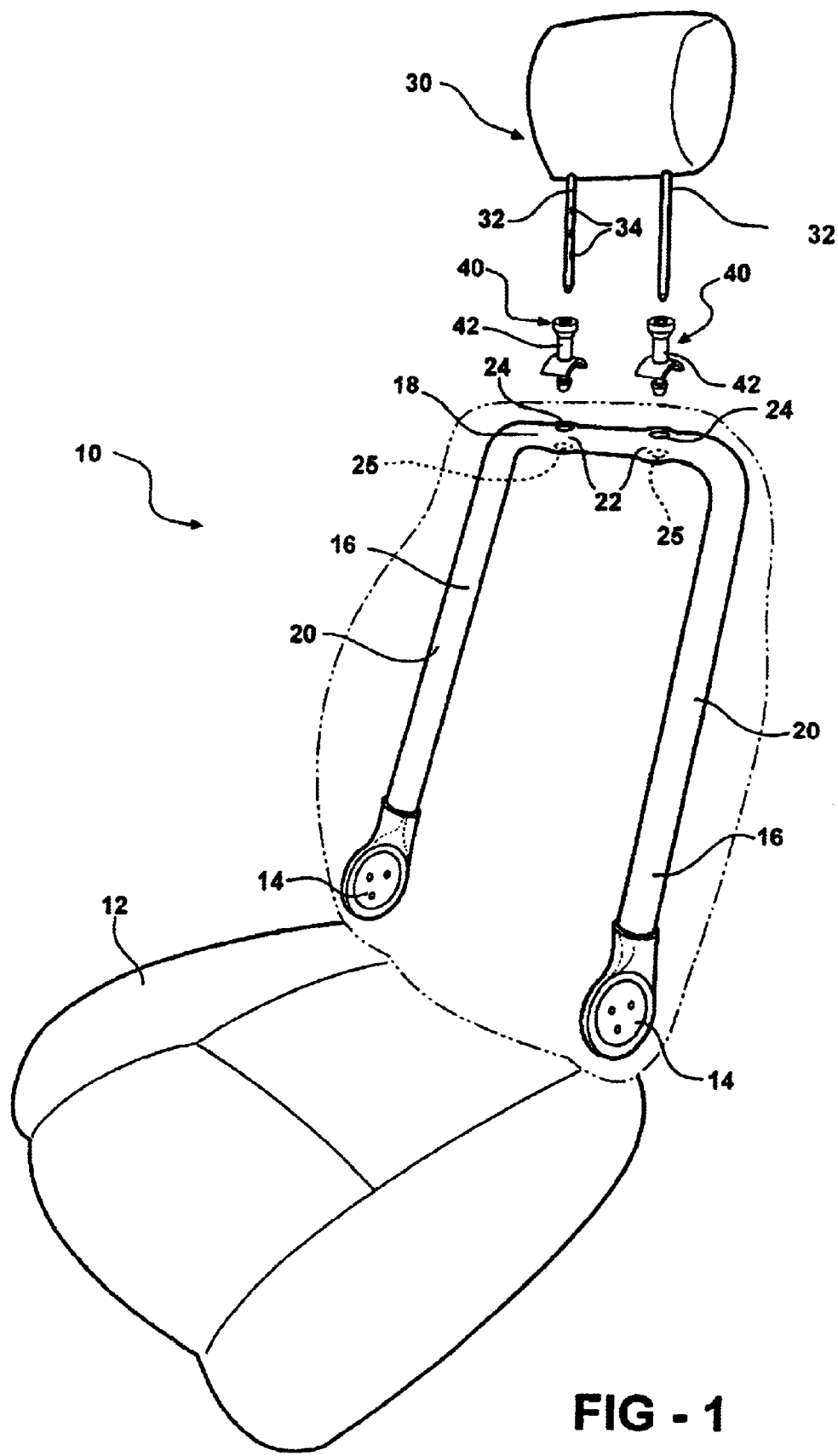
FIG. 1 is a perspective view of a vehicle seat assembly incorporating a head restraint guide assembly according to the present invention.

Referring to the figures, FIG. 1 discloses a seat assembly 10 having a seat cushion 12 and a seat back 14. The seat back 14 is operatively interconnected to the seat cushion 12 by a recliner mechanism 14 that allows angular adjustment of the seat back 14 relative to the seat cushion 12. The seat back 14 includes a frame 16 supporting a foam pad encased by a trim cover, as known to one skilled in the art. The frame 16 is generally U-shaped and has an upper cross member 18 extending between parallel and spaced apart side members 20. The side members 20 extend between the upper cross member 18 and the recliner mechanism 14.

A head restraint 30 having downwardly extending and spaced apart support posts 32 is supported by the upper cross member 18. More specifically, a pair of spaced apart apertures 22 are formed in the upper cross member 18, each presenting diametrically opposite upper and lower peripheral frame edges 24, 25. A guide assembly 40 is inserted into each of the apertures 22 and supported by the respective upper and lower peripheral frame edges 24, 25. Each guide assembly 40 includes a center bore 42, complementary to the support posts 32, for slidably receiving one of the support posts 32 of the head restraint 30. Additionally, a series of incrementally spaced apart detents, or locating recesses, 34 are formed along at least one of the support posts 32. Described in greater detail below, the guide assembly 40 includes a locking mechanism, such as a spring loaded tab as is commonly known in the art, that engages the detents 34 of the support posts 32 and allows for selective, incremental sliding adjustment of the head restraint 30 between a plurality of head supporting positions relative to the seat back 14.

Figure 2:
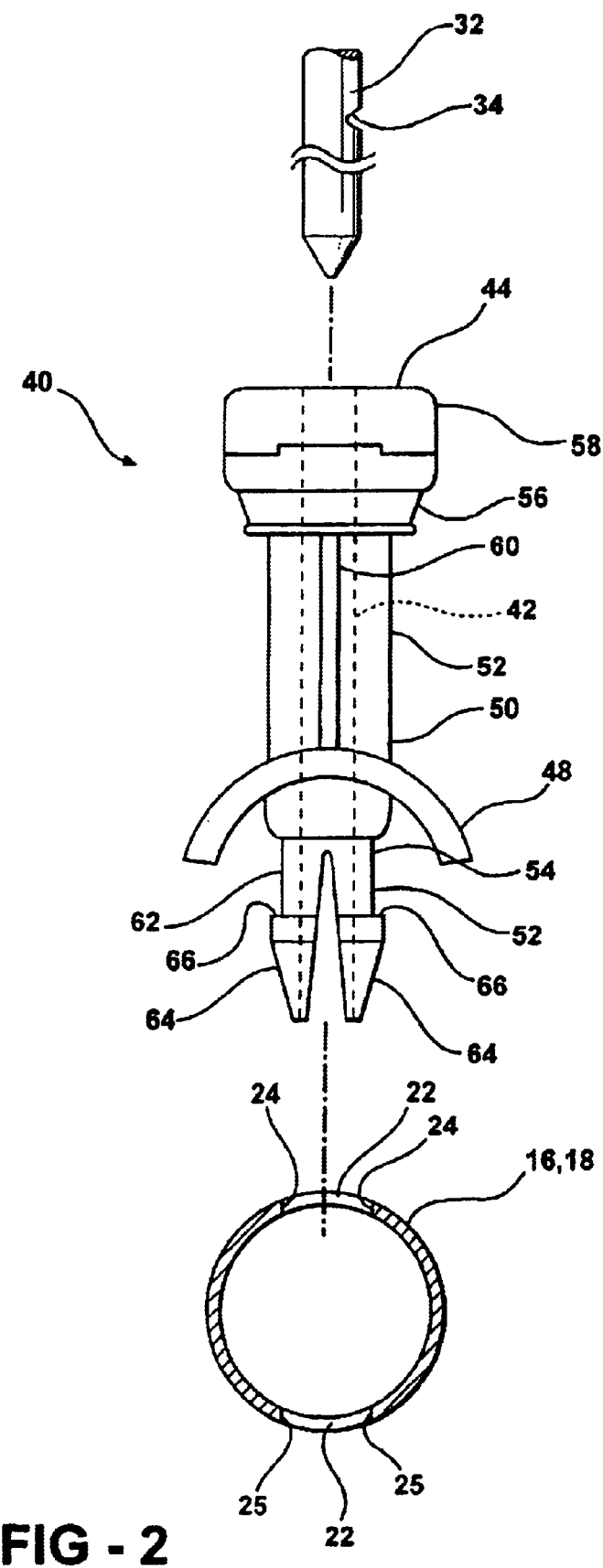
FIG. 2 is a front view of the head restraint guide assembly.

Referring to FIG. 2, the guide assembly 40 has opposite upper and lower ends 44, 46. Generally, the center bore 42 extends between and through both of the upper and lower ends 44, 46. The guide assembly 40 includes a generally cylindrical center tube or main body 50 extending between upper and lower portions 52, 54. The main body 50 also includes an upper cup-shaped head portion 56. The head portion 56 is adapted to nestingly receive the locking mechanism that engages the detents 34 of the support posts 32. A cap 58 is mated to the head portion 56 and defines the upper end 44 of the guide assembly 40. The cap 58 and the head portion 56 together house the locking mechanism. The locking mechanism can be of any suitable design, typically a button-actuated pin that is spring biased into engagement with the detents 34 of the support posts 32.

Structural ribs 60 are formed longitudinally in the main body 50 to increase the bending stiffness of the main body 50. A lip 48, formed in the upper portion 52 and spaced adjacent to the lower portion 54, extends radially outwardly and downwardly therefrom. The lip 48 may be arcuate in shape, planar, U-shaped, or otherwise formed to, correspondingly mate with at least a portion of the upper cross member 18. The lower portion 54 of the main body 50 comprises a pair of symmetrically opposite and spaced apart legs 62. Each of the legs 62 extends longitudinally and downwardly from the upper portion 52. A ramped surface 64 is formed in each of the legs 62 and defines the lower end 46 of the guide assembly. As viewed in FIG. 2, each ramped surface 64 is angled upwardly and outwardly and terminates at a locating end 66.

During assembly of the guide assembly 40 to the frame 16, the lower end 46 of the guide assembly 40 is inserted into one of the apertures 22. As the guide assembly 40 is pushed into the aperture 22, the ramped surfaces 64 slide past the upper peripheral edge 24 of the aperture 22. The sliding action of the ramped surfaces 64 against the upper peripheral edge 24 causes the legs 62 to deform elastically inwardly towards each other to facilitate insertion of the lower portion 54 into the aperture 22. Once the ramped surfaces 64 move past the upper peripheral edge 24, the legs 62 return to their original spaced apart positions, thereby presenting the ramped surfaces 64 for engagement with the lower peripheral edge 25 of the aperture 22. As the ramped surfaces 64 engage the lower peripheral edge 25 of the aperture 22, the legs 62 are again deformed inwardly towards each other. Once the ramped surfaces 64 move past the lower peripheral edge 25, the legs 62 return to their original spaced apart positions. The locating edge 66 engages the lower peripheral edge 25 to prevent removal of the guide assembly 40 from the aperture 22. Further, the lip 48 locates and abuts against the upper cross member 18 of the frame 16. The locating edge 66 and the lip 48 together serve to lock and constrain axial movement of the guide assembly 14 relative to the upper cross member 18.

The head restraint 30 is assembled to the frame 16 by inserting each support post 32 into the center bore 42 of a respective guide assembly 40 until the locking mechanism engages the detents 34 in the support post 32. Adjustment of the head restraint 30 relative to the seat back 14 requires manually releasing the locking mechanism out of engagement with the detent 34 to allow the support post 32 to slide within the center bore 42 of the guide assembly 40.

As described above, the guide assembly 40 can be mounted directly to the upper cross member 18 of the frame 16 by insertion into one of the apertures 22 formed in the upper cross member 18. Unlike the guide assembly 40, conventional guide designs typically require insertion into a support tube that is fixedly secured to the upper cross member 18. Thus, an objective of the present invention is the elimination of parts from the construction of the frame 16. Described below, another objective of the present invention is to provide a method of forming the apertures 22 in the upper cross member 18 of the frame 16.

Figure 3:
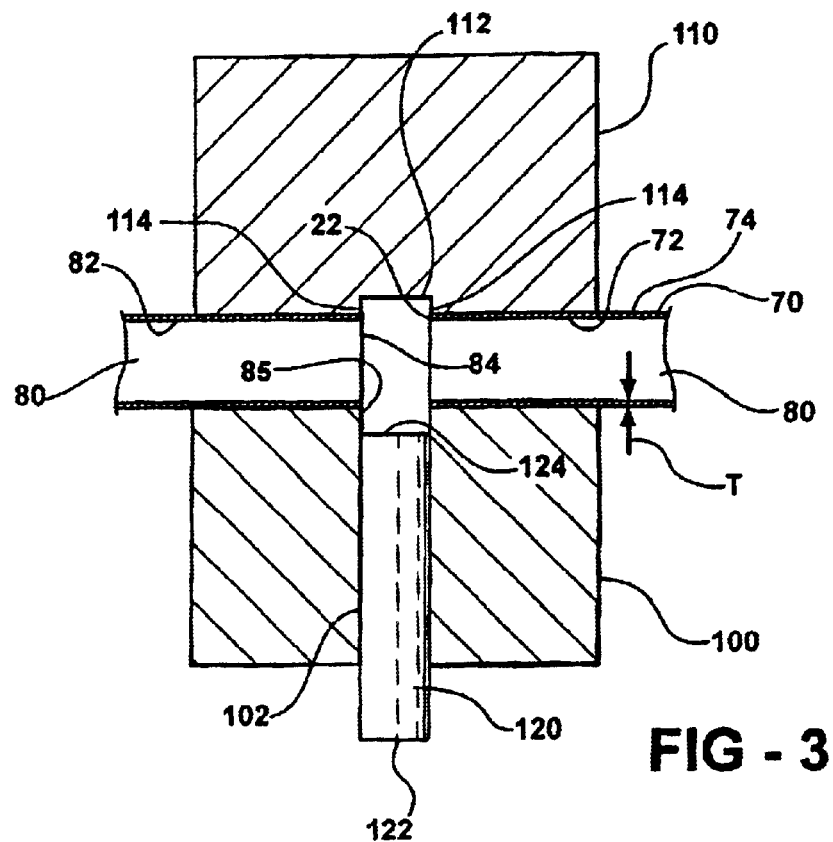
FIG. 3 is a fragmented sectional view of the tool components utilized in a hole punching process for tubular members.

Referring to FIG. 3, the frame 16 is formed from a tube 70 having substantially parallel inner and outer surfaces 72, 74 defining a tube wall thickness t. The tube 70 in the preferred embodiment is subjected to a bending operation to form the general U-shape of the frame 16. However, prior to bending the tube 70 it is desirable to form the apertures 22 in the tube 70. A punching operation is utilized to form the apertures 22 in the tube 70. The punching operation includes the insertion of a mandrel 80 into the tube 70. The mandrel 80 is preferably solid and has an outer surface 82 complimentary to the inner surface 72 of the tube 70. The mandrel 80 supports the inner surface 72 of the tube 70 during the punching operation. A bore 84 for each for the apertures 22 punched in the tube 70 is formed in the mandrel 80. Each bore 84 corresponds in shape and longitudinal position to the apertures 22 to be formed in the tube 70 by the punching operation. Each bore 84 presents a first peripheral cutting edge 85.

First and second blocks 100, 110 circumferentially clamp against the outer surface 74 of the tube 70. For each aperture 22 to be formed, a cylindrical guide bore 102 is formed through the first block 100 transverse to the tube 70. The guide bore 102 is axially aligned with the bore 84 in the mandrel 80 and includes substantially equivalent outer dimensions. A die cavity 112 is recessed in the second block 110 and aligned axially with the guide bore 102. The die cavity 112 presents a second peripheral cutting edge 114 corresponding in shape to the apertures 22 that are to be formed in the tube 70 by the punching operation. A punch 120, preferably cylindrically shaped, having proximal and distal ends 122, 124 is slidably engaged with each of the guide bores 102. The proximal end 122 of the punch 120 is operatively interconnected to any suitable linear actuating mechanism, such as a hydraulic cylinder. The distal end 124 of each punch 120 has a perimeter shape complementary to the shape of respective bores 84 in the mandrel 80. The distal ends 124 are appropriately dimensioned to slidably engage the bores 84 in the mandrel 80 and the die cavities 114 of the second block 110 during the punching operation.

In operation, each punch 120 is guided by their respective guide bore 102 and is driven axially by the actuating mechanism towards the tube 70. The punches 120 are driven by the actuating mechanism with sufficient force so that the distal end 124 of each punch 120 pierces the tube 70. The distal end 124, upon entering the bore 84, cooperates in cutting and shearing engagement with the peripheral cutting edge 85 of the mandrel 80 to form the upper peripheral frame edge 24. Similarly, upon entering the die cavity 112 of the second block 110, the distal end 124 cooperates in a cutting or shearing engagement with the peripheral edge 114 to form the lower peripheral frame edge 25. Salvage material that is punched from the tube 70 during the punching operation can be deposited into the die cavity 112 for later removal by a punch operator. Alternatively, exit channels could be bored through the second block 110 extending into each of the die cavities to receive the salvage material during the punching operation.

It should be appreciated that throughout the punching operation, the outer surface 72 is supported by the first and second blocks 100, 110 and the inner surface 74 is supported by the mandrel 80. Further, a clearance exists between the distal end 124 of the punch 120 and the first and second peripheral cutting edges 85, 114. This clearance, in one respect, is sufficient to allow the distal end 124 to pass through the bore 84 of the mandrel and the die cavity 112 of the second block 110, and in another respect, is sufficient to effect a shearing of the tube 70 during the punching operation. As a result of this clearance and the support provided by the first and second blocks 100, 110, the upper and lower peripheral frame edges 24, 25 that define the apertures 22 in the tube 70 are free from flanges or burrs.

Figure 4:
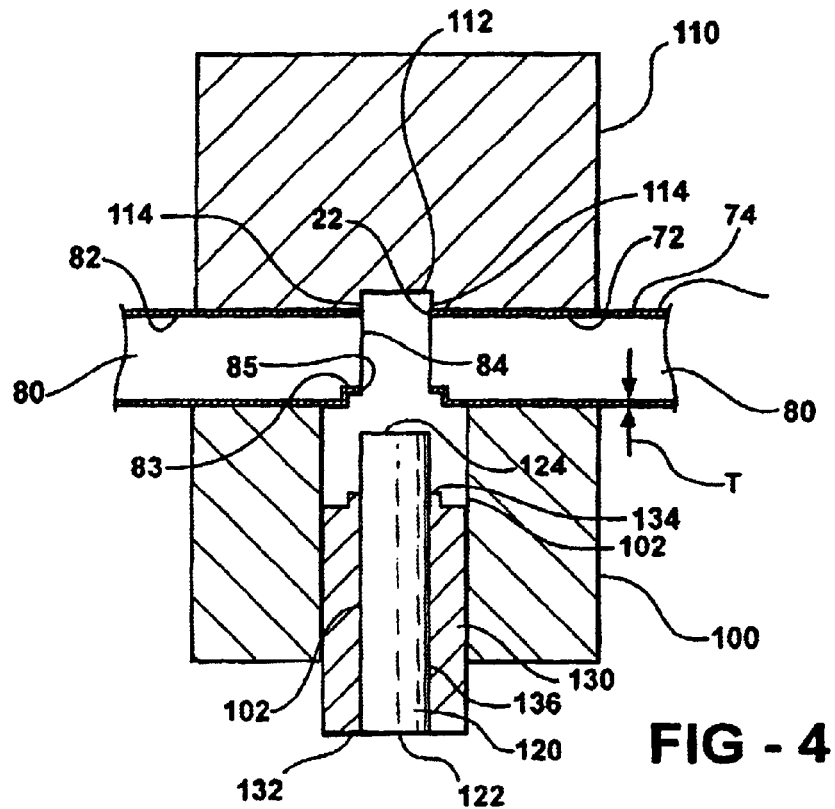
FIG. 4 is a fragmented sectional view of an alternative embodiment of the tool components utilized in the hole stamping punching for tubular members.

Referring to FIG. 4, an alternative embodiment of the punching operation is illustrated wherein a recessed portion 76 is formed in the tube 70 prior to the formation of the upper peripheral frame edge 24. The upper peripheral frame edge 24 is subsequently formed within the recess 76. Specifically, a first guide bore 102 is formed in the first block 100 transverse to the tube 70. A punch guide sleeve 130 having proximal and distal ends 132, 134 is slidably engaged with the first guide bore 102. A second guide bore 136 extends through and between the proximal and distal ends 132, 134 of the punch guide sleeve 130. The punch 120 is slidably displaceable within the second guide bore 136 of the punch guide sleeve 130. The proximal ends 122, 132 of the punch 120 and punch guide sleeve 130, are operatively interconnected to any suitable linear actuating mechanism, such as a hydraulic cylinder. A die recess 83 is formed in the mandrel 80 to receive the distal end 132 of the punch guide sleeve 130. The die recess 83 and the distal end 132 cooperate during the punching operation to form the recessed portion 76. A bore 84 is formed in the die recess 83 to receive the distal end 124 of the punch. The bore 84 presents a first peripheral cutting edge 85. A split may be formed transversely in the mandrel 80 at the die recess 83 to allow removal of the mandrel 80 from the tube 70 after the punching operation.

In this alternative punching operation, each punch guide sleeve 130 and punch 120 is driven axially into engagement with the tube 70. The punch guide sleeve 130 slides relative to the first block 100 within the first guide bore 102. The distal end 134 of the punch guide sleeve 130 locally deforms a portion of the tube 70 into the die recess 83 to form the recessed portion 76. Once the recessed portion 76 is formed, the punch 120 continues its axial translation within the second guide bore 136 relative to the punch guide sleeve 130 towards the tube 70. The distal end 122 of the punch 120 cooperates with the first peripheral cutting edge 85 of the mandrel 80 in a cutting and shearing action to form the upper peripheral frame edge 24 in the recessed portion 76 of the tube 70. The punch 120 continues its axial displacement into the die cavity 112 in the second block 110 until the distal end 122 cooperates in a cutting and shearing action with the second peripheral edge 114 of the second block 110 to form the lower peripheral frame edge 25 in the tube 70. Additionally, it should be appreciated that a die recess may also be formed along the opposite side of the mandrel to form a recess portion in the tube 70 adjacent the lower peripheral frame edge 25.

Figure 5:
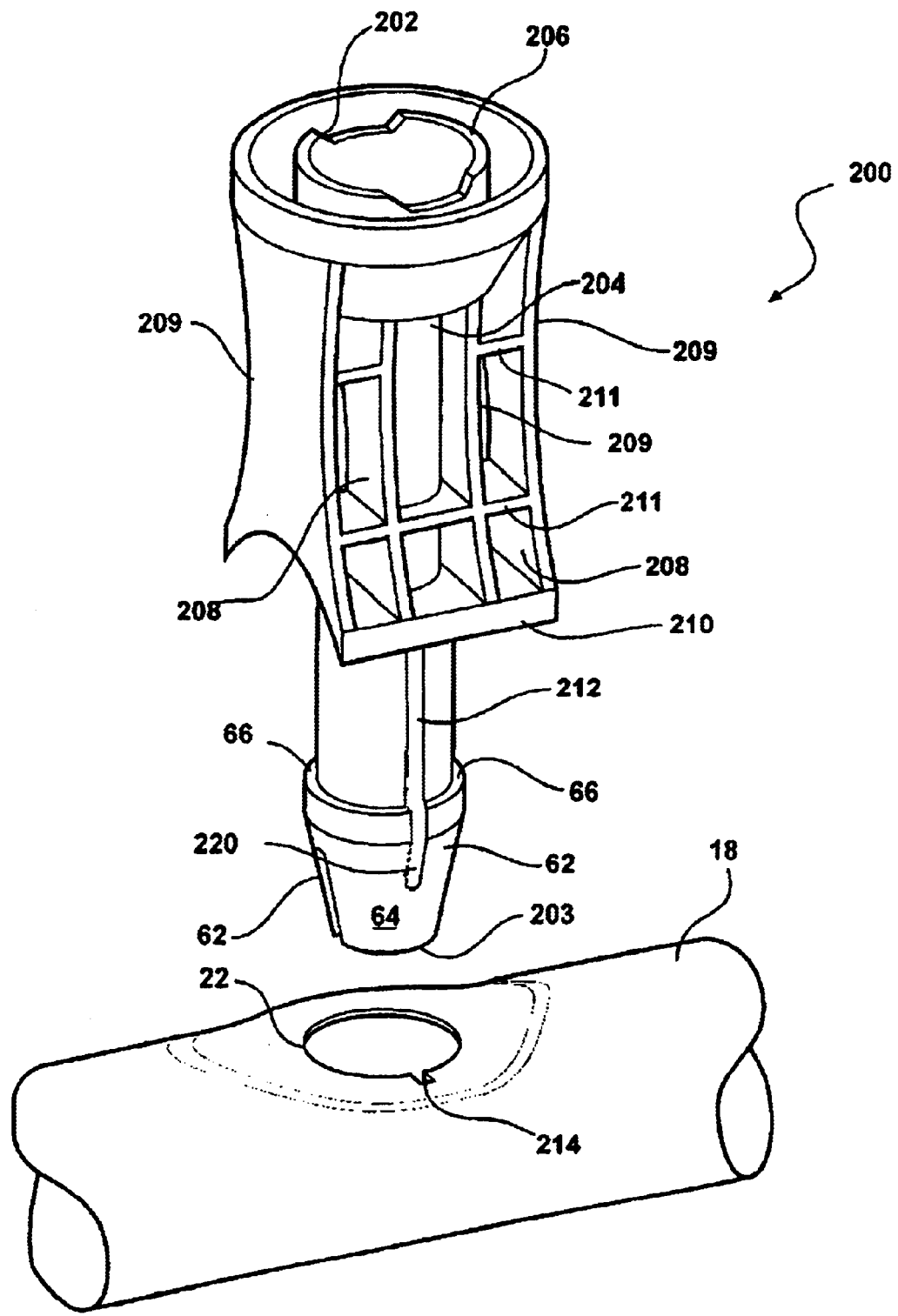
FIG. 5 is a perspective view of an alternative head restraint guide assembly.

Referring to FIG. 5, an alternative embodiment of a head restraint guide assembly 200 is shown. The guide assembly 200 is substantially the same as the guide assembly 40 of FIG. 2, and therefore, mainly only the differences will be described. The guide assembly 200 includes a center tube 204 extending between opposite first and second ends 202, 203 and defining a bore 206 extending longitudinally therethrough. A lattice of structural ribs 208 extends from the center tube 204 for providing rigidity and structural support to the guide assembly 200. A lip or support wall 210 is supported by the ribs 208 and extends outwardly from the outer peripheral surface of the tube 204 for abutting the upper cross member 18. More specifically, the lattice of structural ribs 208 are defined by a plurality of first 209 and second 211 ribs. The first ribs 209 extend longitudinally along the center tube 204 between the first end 202 and the support wall 210. The first ribs 209 are interconnected by the second ribs 211 extending in a generally normal orientation between the first ribs 209. The support wall 210 is shown as being generally flat, or planar, for contact with a flat surface of the cross member 18. However, it should be appreciated that the support wall 210 may be arcuate shaped or otherwise to matingly complement the surface shape of the cross member 18.

The tube 204 is dimensioned to be received through the aperture 22 in the cross member 18. The tube 204 further includes an upstanding locating rib 212 extending longitudinally from the support wall 210 to the end of the tube 203. The upstanding locating rib 212 is dimensioned to be received within a notch 214 in the edge of the aperture 22. The rib 212 assists in locating and aligning the guide assembly 200 with the aperture 22 in the cross member 18. The tube 204 similarly includes a pair of symmetrically opposite and spaced apart legs 62 having a ramped surface 64 and locating end 66 as previously described with reference to FIG. 2. Finally, a raised protrusion 220 projects from the locating rib 212 adjacent the locating end 66 for engagement with the edge of the notch 214 in the aperture 22. During insertion of the tube 204 into the aperture 22, the legs 62 are slightly compressed and the locating rib 212 is aligned with the notch 214. The protrusion 220 contacts the edge of the notch 214 and is generally shear from the rib 212 as the tube 204 continues through the cross member 18. The protrusion 220 prevents excessive wear on the rib 212 during assembly and maintains a close tolerance fit between the tube 204 and the aperture 22 to prevent lateral movement and rattle therebetween. A similar locating rib may be formed on the inner surface of the tube 204 for mating engagement with the post of the head restraint to further prevent lateral movement and rattle between the head restraint and guide assembly. It should further be appreciated that the mandrel and cutting dies of the assemblies described in FIGS. 3 and 4 may be shaped to form the corresponding shape of the aperture 22 and notch 214 in the cross member 18.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A head restraint guide for defining a channel between a top of a seat back and through an aperture of a seat back frame to allow a support post of a head restraint to slide therethrough, said head restraint guide comprising:

a center tube extending between first and second ends, said center tube defining an outer surface and a bore extending axially therethrough;

a support wall extending perpendicularly from said outer surface of said center tube for abutting the seat frame and preventing said center tube from moving therepast;

a support extending between said first end and an intermediate point along said center tube between said first and second ends corresponding to a portion of said center tube extending out from the seat back frame to the top of the seat back, said support including a plurality of structural ribs extending between and fixedly secured to said first end of said center tube and said support wall and defining a lattice including a first set of ribs and a second set of ribs extending perpendicular, to said first set of ribs wherein said lattice surrounds and encases said center tube between said first end and said support wall to provide rigidity and structural support to said head restraint guide.

2. A head restraint guide as set forth in claim 1 including a locating rib extending longitudinally between said support wall and said second end of said center tube defining an orientation of said head restraint guide during insertion into the aperture in the seat back frame.

3. A head restraint guide as set forth in claim 2 including a pair of legs formed in said second end of said center tube, said legs having a ramped surface engagable with a peripheral edge of the aperture for inwardly displacing said legs during insertion of said head restraint guide within the aperture.

4. A head restraint guide as set forth in claim 3 wherein each of said legs includes a locating end spaced from said support wall for locating the seat back frame between said locating end and said support wall after insertion of said head restraint guide into the aperture.

5. A head restraint guide as set forth in claim 4 including a protrusion projecting from said locating rib for preventing lateral movement and rattle between said head restraint guide and the seat back frame.

* * * * *